(12) United States Patent
Stahl

(10) Patent No.: US 12,264,779 B2
(45) Date of Patent: Apr. 1, 2025

(54) PRESSURE VESSEL AND METHOD FOR PRODUCING A PRESSURE VESSEL

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 303 days.

(21) Appl. No.: 17/593,914

(22) PCT Filed: Mar. 17, 2020

(86) PCT No.: PCT/EP2020/057172
§ 371 (c)(1),
(2) Date: Sep. 28, 2021

(87) PCT Pub. No.: WO2020/193261
PCT Pub. Date: Oct. 1, 2020

(65) Prior Publication Data
US 2022/0170595 A1    Jun. 2, 2022

(30) Foreign Application Priority Data
Mar. 28, 2019    (DE) .................... 10 2019 107 984.5

(51) Int. Cl.
*F17C 1/06*    (2006.01)

(52) U.S. Cl.
CPC ........ *F17C 1/06* (2013.01); *F17C 2201/0157* (2013.01); *F17C 2201/035* (2013.01); *F17C 2201/056* (2013.01); *F17C 2203/013* (2013.01); *F17C 2203/0604* (2013.01); *F17C 2203/0617* (2013.01); *F17C 2203/0619* (2013.01); *F17C 2203/066* (2013.01); *F17C 2203/0663* (2013.01); *F17C 2209/2109* (2013.01);

(Continued)

(58) Field of Classification Search
CPC .......................... F17C 2203/0663; F17C 1/06
See application file for complete search history.

(56) References Cited

U.S. PATENT DOCUMENTS

| | | |
|---|---|---|
| 1,743,459 A | 1/1930 | Kjekstad |
| 5,387,455 A | 2/1995 | Hörsch |

(Continued)

FOREIGN PATENT DOCUMENTS

| | | |
|---|---|---|
| DE | 29 31 947 A1 | 2/1981 |
| DE | 197 25 369 A1 | 2/1998 |

(Continued)

OTHER PUBLICATIONS

Chinese-language Office Action issued in Chinese Application No. 202080023335.9 dated Jul. 1, 2022 with English translation (20 pages).

(Continued)

*Primary Examiner* — Stephen J Castellano
(74) *Attorney, Agent, or Firm* — Crowell & Moring LLP

(57) ABSTRACT

A pressure vessel for containing pressure, for example, high pressure associated with storage of compressed gaseous fuels, includes a wall which surrounds an interior space. The wall includes an arrangement of wall threads and a matrix. An internal structure having a number of internal threads is provided for bracing, the internal threads having portions embedding in the matrix adjacent to the wall threads. A method for producing a pressure vessel of this type is also provided.

6 Claims, 2 Drawing Sheets

(52) U.S. Cl.
CPC ............... *F17C 2209/2154* (2013.01); *F17C 2209/232* (2013.01); *F17C 2223/0123* (2013.01); *F17C 2260/011* (2013.01); *F17C 2260/012* (2013.01); *F17C 2260/013* (2013.01); *F17C 2260/018* (2013.01); *F17C 2260/042* (2013.01); *F17C 2270/0168* (2013.01)

(56) References Cited

U.S. PATENT DOCUMENTS

| | | | |
|---|---|---|---|
| 5,462,193 | A | 10/1995 | Schoo |
| 5,647,503 | A | 7/1997 | Steele et al. |
| 5,651,474 | A | 7/1997 | Callaghan et al. |
| 5,704,514 | A | 1/1998 | Schoo |
| 2009/0283176 | A1 | 11/2009 | Berry et al. |
| 2014/0326738 | A1 | 11/2014 | Knoop |

FOREIGN PATENT DOCUMENTS

| | | |
|---|---|---|
| DE | 197 49 950 A1 | 5/1999 |
| DE | 10 2009 057 170 A1 | 6/2011 |
| DE | 10 2011 116 656 B3 | 1/2013 |
| FR | 2 764 671 A1 | 12/1998 |
| WO | WO 99/23412 A2 | 5/1999 |

OTHER PUBLICATIONS

International Search Report (PCT/ISA/210) issued in PCT Application No. PCT/EP2020/057172 dated Jun. 12, 2020 with English translation (seven (7) pages).

German-language Written Opinion (PCT/ISA/237) issued in PCT Application No. PCT/EP2020/057172 dated Jun. 12, 2020 (six (6) pages).

German-language Search Report issued in German Application No. 10 2019 107 984.5 dated Dec. 3, 2019 with partial English translation (13 pages).

PRESSURE VESSEL AND METHOD FOR PRODUCING A PRESSURE VESSEL

BACKGROUND AND SUMMARY OF THE INVENTION

The technology disclosed herein relates to a pressure vessel and to a method for producing such a pressure vessel.

Pressure tanks, as such, are known in principle. They may be embodied for example as fiber-reinforced pressure tanks. They are used, for example, in motor vehicles or other mobile units for the storage of fuel, which is gaseous at room temperature and normal pressure. The storage of fuel under high pressure makes it possible to store a considerably higher quantity of fuel in a predefined volume.

It has been shown that pressure tanks are often expected to be adapted to certain existing installation spaces, which are present in motor vehicles, in order to optimally utilize such an installation space. Installation spaces of this kind often do not have a simple shape, such as for example a ball or cylinder shape. The better a pressure vessel can be adapted to the installation space, the better the existing space can be utilized.

For this purpose, for example serpentine tanks, sausage-type tanks or honeycomb-type tanks are known from the prior art. Serpentine tanks are formed for example from a plurality of connected tanks with a relatively small diameter. However, the space between the tanks remains unused as a result. Honeycomb-type tanks also use space between the tanks by deviating from the round shape at least for internal walls between the tanks. Since the same pressure is applied on both sides, the round shape is not required there. However, honeycomb-type tanks are complex to produce. In addition, only the stresses perpendicular to the longitudinal axis are taken up by the customary winding method. A separate solution is required for the stresses in the longitudinal direction. Moreover, in the case of honeycomb-type tanks, in addition to the very complex production, resin and liner are furthermore provided for the inner walls, as a result of which the useful volume of the vessel is reduced.

It is therefore an object to provide a pressure vessel which in this regard has an alternative or more effective embodiment, for example makes even better use of the available installation space. It is furthermore an object to provide a method for producing such a pressure vessel.

This is achieved by means of a pressure vessel and a method according to the respective main claims. Advantageous embodiments can be gathered for example from the respective subclaims. The content of the claims is incorporated in the content of the description by express reference.

The technology disclosed herein relates to a pressure vessel. The pressure vessel comprises a wall which surrounds an interior space, wherein the wall comprises an arrangement of wall threads and a matrix, wherein the arrangement is embedded in the matrix. The pressure vessel comprises an internal structure which comprises a number of inner threads. The inner threads enter the wall at respective entry points and are anchored in the matrix. The inner threads each brace at least two entry points of the wall in relation to one another.

The use of the pressure vessel just described makes it possible to provide the required stability exclusively or at least in part by means of the inner threads. In comparison with the inner walls known from the prior art or the embodiment with separate tanks, the inner threads are much less complex and occupy a significantly smaller volume. As a result, it is possible to make optimal use of the installation space, and only a very small volume is lost to inner walls.

The arrangement of wall threads may be embodied in a grid-like manner, for example. The inner threads may for example be arranged parallel to one another in groups. The bracing of respective entry points makes it possible to achieve stability against corresponding stretching of these points in the wall.

According to one embodiment, for anchoring in the matrix, the inner threads each engage around a number of wall threads between two entry points. During production, the inner threads may in this case be guided for example via a thread stock such as a roll through the wall threads or, if the free thread end is used, for example the free end of the inner thread may be guided over a longer route through the wall threads, in order to at least pass back through the interior space again.

According to a further embodiment, respective inner threads run through the matrix between a number of wall threads and an outer side of the wall. This embodiment has advantages in terms of production technology since it makes it possible to achieve an anchoring, in which case the inner thread has to be guided only over the minimally required distance.

The aforementioned embodiments can also be combined, that is to say inner threads which engage around wall threads may be provided and inner threads which run between the wall threads and the outer side of the wall may be provided. The two possible embodiments make it possible to achieve a respective anchoring of the inner threads in the wall.

According to one embodiment, the respective inner thread runs between two of its entry points exclusively within the matrix. As a result, any leaks which could occur as a result of an inner thread exiting out of an outer side of the wall can be avoided.

According to one embodiment, the wall is configured to be flat. According to a further embodiment, the wall is configured in the form of ball and/or cylinder segments which adjoin one another. These embodiments can also be combined, that is to say a part of the wall may be configured to be flat and a part of the wall may be configured in the form of ball and/or cylinder segments which adjoin one another. This can relate in each case both to the outer and to the inner boundary of the wall. However, outer and inner boundaries of the wall may also be configured differently. For example, combinations may also be provided, wherein for example an outer side may be embodied in flat form, whereas ball and/or cylinder segments are provided on the inner side.

If ball and/or cylinder segments are provided, these preferably have a diameter of less than 2.5 cm and particularly preferably a diameter of less than 1 cm. This has proven to be advantageous for typical applications. As a result, in particular an advantageous distribution of pressure can be achieved, and the wall thickness can be reduced to the minimally required dimension.

According to a preferred embodiment, at least some or all of the entry points lie at a respective boundary between two ball and/or cylinder segments which adjoin one another. This has proven to be advantageous with regard to the stability.

Preferably, the inner threads run completely or partially freely in the interior space. Further preferably, said inner threads are not embedded in a matrix or a liner in the interior space. As a result, an optimum utilization of space can be achieved. The corresponding embodiment may relate to all of the inner threads or only to some of the inner threads. Finally, each inner thread which is not encased by a liner and/or a matrix can lead to a better utilization of space compared with the encased embodiment.

Inner threads and wall threads are preferably interlaced with one another in a plain weave, in a twill weave or in an M-to-N weave. Interlacing methods of this kind have proven to be advantageous for typical applications.

According to a preferred embodiment, the inner threads brace the wall in one spatial direction, in two spatial directions or in three spatial directions. As a result, corresponding stability in the respective spatial directions can be achieved. Specific geometrical needs can be taken into consideration.

Preferably, the inner threads are embedded partially in a matrix such that a number of external chambers, which are each delimited in a gas-tight manner, are formed in the interior space. Said chambers may in particular be close to an inner surface of the wall. This makes it possible to achieve additional sealing on the outer side, such that for example an interior space of the pressure vessel lying even further toward the inside is delimited from an outer wall by the chambers which are delimited in a gas-tight manner. As a result, resistance to impacts or mechanical damage can be increased, for example. It is also possible to perform a leak test by means of chambers of this kind, since they can be pressurized independently of one another.

The technology disclosed herein furthermore relates to a method for producing a pressure vessel as described herein. With respect to the pressure vessel, reference can be made to all of the embodiments and variants described herein. In the method, the wall threads along with respective adjacent or encompassing portions of the inner threads are immersed in a bath of a matrix material. In this case, the matrix material, as a result of its rising up along the inner threads, forms concave boundary surfaces of the wall between the inner threads.

Such a production of concave boundary surfaces of the wall makes it possible to achieve improved resistance with respect to high pressures. The described method, which is based on the immersion in a bath of the matrix material, has proven to be particularly advantageous for forming such concave boundary surfaces without a high outlay on equipment.

Accordingly, in the case of a pressure vessel as described herein, preferably concave boundary surfaces of the wall are formed, in particular in the interior, and in particular in such a way that the respective innermost point of the wall is on a respective inner thread.

The wall threads may form a grid or a linear structure, for example. For the wall or also for inner threads which are to be embedded in a matrix, use can in particular be made of a matrix material that manages without a liner, that is to say without a liner has a sufficient tightness against a gas to be stored escaping. As an alternative thereto, however, separate liners may also be used, which may be passed for example in liquid form into the interior of the pressure vessel, wherein the pressure vessel is subsequently moved in order to wet the entire inner surface of the wall of the pressure vessel.

Preferably, respective entry points of an inner thread lie opposite one another in pairs. As a result, it is possible to achieve advantageous bracing and resistance with respect to high pressures.

Due to the use of small diameters in the case of a ball- and/or cylinder-segment-shaped wall, it is not only possible to improve the volume efficiency on account of better adaptation to a planar wall or other environments, but it is additionally also possible to avoid the thick-walled effect, meaning an increasingly reduced tensile stress with the increasing radius between the inner radius and the outer radius. This thus also brings about a further improvement in the volume efficiency. Use is therefore preferably made of few layers and in particular preferably only one layer of fiber material.

Further features and advantages will be apparent to a person skilled in the art from the exemplary embodiment described below with reference to the attached drawings.

DETAILED DESCRIPTION

Figure 1:
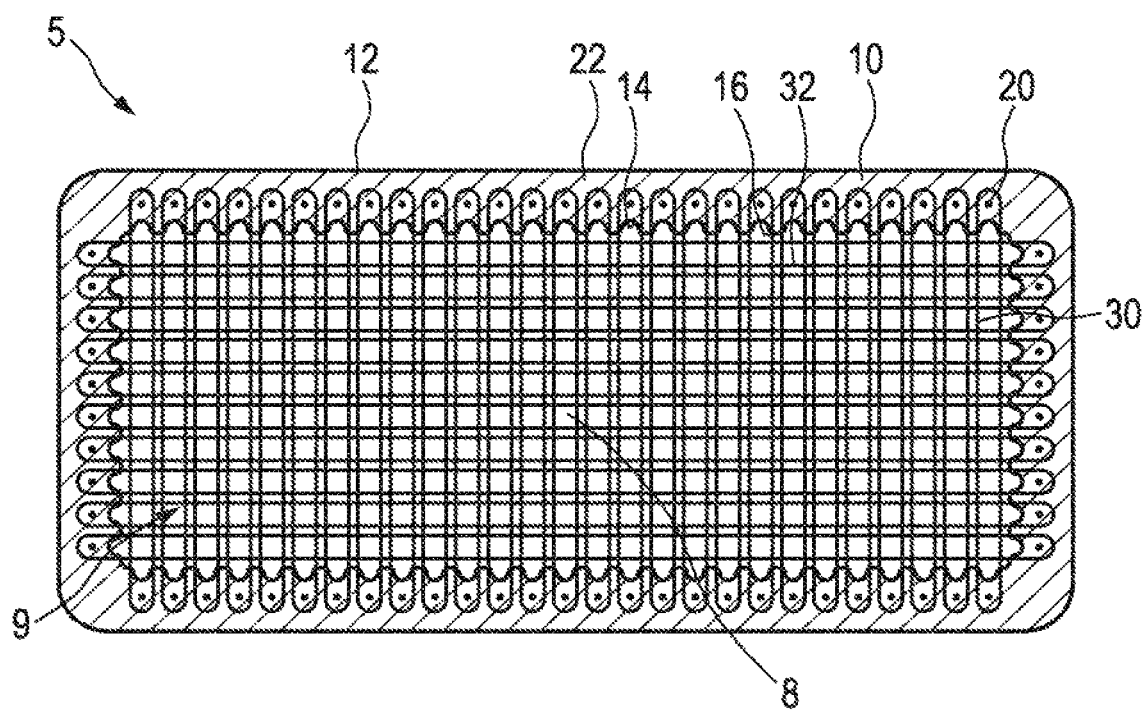
FIG. 1 shows a pressure vessel in accordance with an embodiment of the present invention.

FIG. 1 shows a pressure vessel 5 according to one exemplary embodiment. The pressure vessel 5 comprises a wall 10. The wall 10 has an outer side 12 and an inner side 14. The wall 10 encloses an interior space 8 in which pressurized gas or other substances can be stored.

The wall 10 is formed from a number of wall threads 20 and a matrix 22 in which the wall threads 20 are embedded. In the present case, the wall threads 20 are arranged in a grid-like structure which is not illustrated any further.

An internal structure 9 having a number of vertical inner threads 30 and horizontal inner threads 32 is arranged in the interior of the pressure vessel 5. In this case, the inner threads 30, 32 enter the wall 10 or the matrix 22 at respective entry points 16.

As shown, a respective inner thread 30, 32 engages in this case around a wall thread 20. In this way, the inner threads 30, 32 are interlaced with the wall threads 20, as a result of which a particularly high stability can be achieved. The inner threads 30, 32 are fundamentally anchored in the matrix 22.

As shown, entry points 16 at which the inner threads 30, 32 penetrate into the wall 10 lie opposite one another in each case in pairs. In this way, the inner threads 30, 32 can advantageously ensure stability of the pressure vessel 5, since the pulling apart of respective entry points 16 and thus also of the wall 10 can be prevented by the inner threads 30, 32. This permits a higher pressure load in the case of a constant wall thickness, or a smaller wall thickness for a particular pressure.

It has been shown that, according to an advantageous embodiment, the inner threads 30, 32 are embedded in the matrix 22 merely in the wall 10, in order to prevent slippage. For the interior space 8 which is subjected purely to tensile loading, it is otherwise possible to dispense with a matrix around the inner threads 30, 32. The inner threads 30, 32 thus lie freely in the interior space 8. For an assumed fiber volume content of 60%, for example, this saves a total of 40% of the volume of all of the inner walls, and this volume which is thus freed up is additionally available for the storage of fuel. In other words, the inner walls are reduced to tension braces.

As already mentioned, the anchoring of the inner threads 30, 32 in the wall 10 is assisted by the wall threads 20 running in the wall 10. A plurality of intersecting wall threads 20 may also be used to anchor a respective inner thread 30, 32. Conversely, it is also possible to use one wall thread 20 to anchor a respective plurality of inner threads 30, 32. In other words, all types of weaves, such as for example plain, twill or m-to-n, of woven fabrics may also be employed for the interaction between wall threads 20 and inner threads 30, 32.

Figure 2:
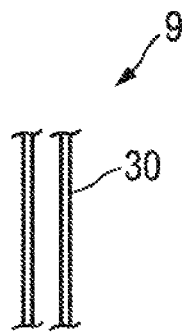
FIG. 2: shows a first possible arrangement of inner threads in accordance with an embodiment of the present invention.
Figure 3:
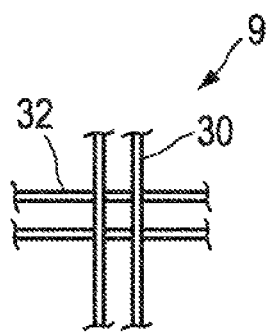
FIG. 3 shows a second possible arrangement of inner threads in accordance with an embodiment of the present invention.
Figure 4:
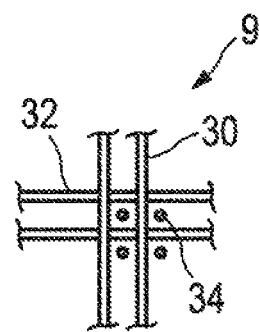
FIG. 4: shows a third possible arrangement of inner threads in accordance with an embodiment of the present invention.

FIG. 2 shows an alternative embodiment in which merely a tensile bracing by means of inner threads 30 in one dimension is present. FIG. 3 shows the embodiment which is already known from FIG. 1 and in which a bracing in two dimensions by means of inner threads 30, 32 is present. FIG. 4 shows a further alternative, wherein a bracing in three dimensions by means of inner threads 30, 32, 34 is present. Embodiments of this kind can be used in a pressure vessel 10. Other arrangements of inner threads 30, 32, 34 are also possible, however.

Spatial directions in which no bracing by means of inner threads 30, 32, 34 is present may each be embodied for example with solutions as in the design of conventional pressure tanks. As a result of the displacement of fibers or threads from the wall 10 into the interior space, it is possible for spaces which can deviate considerably from traditional solutions such as for example cylinders or balls and which can then have planar tank walls to be formed. A liner may be applied to the inner side of the outer wall. However, use may preferably also be made of a matrix material which makes the use of a liner as separate permeation barrier unnecessary. In particular, thermoplastics or thermosets may be used as matrix material for this purpose.

Figure 5:
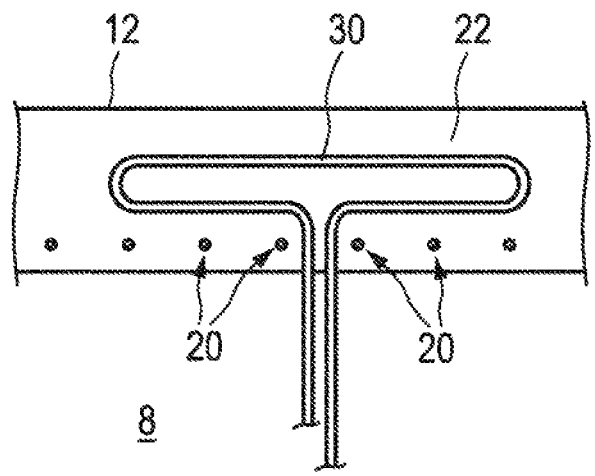
FIG. 5: shows a possible anchoring of inner threads in accordance with an embodiment of the present invention.

FIG. 5 shows an alternative embodiment of the anchoring of an inner thread 30 in the wall 10, said alternative embodiment being able to be used in a pressure vessel in combination with the embodiment shown in FIG. 1 or exclusively as an alternative. In this case, the inner thread 30 does not engage around a wall thread 20, but rather is embedded in the matrix 22 in an approximately T-shaped manner between the wall threads 20 and the outer boundary 12 of the wall 10. This also makes it possible to achieve high stability and good anchoring. The wall threads 20 would nevertheless serve as stabilization for the inner threads 30 in the case of corresponding loading.

A "half-T", or an "L", that is to say embedding on substantially one side, is also possible. However, three-dimensional embedding is preferred, that is to say a profile of the inner thread 30 in the matrix 22 such that the profile of the inner thread in the interior space 8 and in the matrix 22 does not lie in one plane. For example, the profile in the matrix 22 could describe a circle, an ellipse or an "8".

The matrix for the wall 10 can be produced by different methods. For example, the subsequent wall or the wall threads 20 may be immersed in a resin bath. The force of gravity and capillary forces can in this case have the effect that the matrix material is placed around the inner threads 30, 32, 34 in such a way that variations in stiffness are avoided. Additive manufacturing methods, in particular liquid material methods, can also be used for this. The planar geometry of the tank wall makes it much easier to carry out both bath and immersion methods and liquid material methods.

Preferably, during the production of the tank wall, concave structures are also produced around the inner threads 30, 32, 34 by the matrix, specifically as viewed from the interior space. This is already shown in FIG. 1. Concave structures of this kind have a favorable effect on the strength properties, since the force acting on the outer wall is satisfactorily distributed to the inner threads 30, 32, 34.

Ideally, the pressure vessel 10 is designed such that with increasing internal pressure stretching occurs uniformly on all sides. As a result, bending forces are largely avoided.

The surface density of the inner threads 30, 32, 34 anchored in the outer wall has a direct influence on the stiffness properties of the respective surface element. By adapting the surface density of the inner threads 30, 32, 34 anchored in the wall 10, it is thus possible for the uniform stretching to be shaped or forced. In particular, this can be employed in the vicinity of edges and corners, since the wall 10 has an inherent stiffness transverse to the inner threads 30, 32, 34 due to the wall threads 20, said inherent stiffness being taken into account for the design of the pressure vessel 10.

In order to increase the vessel safety even further, it is possible to not completely dispense with a liner and matrix material for all of the internal walls or inner threads 30, 32, 34. Instead, a type of double-wall structure or generally multi-wall structure can be achieved through targeted use of matrix, and possibly also liner, for inner walls which are located near to the tank wall 10. This can be used for the diagnosis of leaks, for example. In addition, the behavior with respect to external mechanical influences, for example in the case of a crash, is improved.

Generally speaking, the inner threads 30, 32, 34 in the interior space 8 improve the burst properties, since said inner threads represent a flow obstruction for very high speeds, as would occur in the event of a tank bursting, and thus can effectively level off the pressure wave in the burst event. The wall threads 30, 32, 34 without surrounding matrix material have the effect that there is a very efficient transfer of heat with respect to the wall 10. In addition, the inner threads 30, 32, 34 represent a very large surface.

For example, a short-fiber-reinforced plastic or a metal alloy can also be used for production of the wall 10, wherein for example highly cost-effective extrusion methods can be used. Preferably, in the case of short-fiber-reinforced plastic, forming should take place in such a way that the fibers are thereby oriented in the direction of loading of the pressure tank 10. Here, too, additive manufacturing methods can be employed again. It is for example possible to use a powder bed method, preferably using a metal powder. Corresponding process control thus makes it possible to design the wall 10 to be gas-tight, for example, but to design the inner walls to be intentionally permeable to gas.

Overall, it has been shown that there is a very great improvement in the volume efficiency of the pressure vessel 10 in the embodiments under consideration. Efficient use of cuboidal or differently shaped installation spaces is made possible. Furthermore, there is very efficient heat conduction with respect to the wall 10. Burst protection and an additional degree of safety can also be achieved by means of an internal multi-wall structure.

What is claimed is:

1. A method for producing a pressure vessel having a wall surrounding an interior space, the wall including an arrangement of first threads embedded in a matrix, and an internal structure disposed in the interior space, the internal structure including a plurality of horizontal second threads and a plurality of vertical third threads, wherein the plurality of horizontal second threads and the plurality of vertical third threads each enter the wall at two respective entry points that lie opposite one another in a pair and are anchored in the matrix, and the plurality of horizontal second threads and the plurality of vertical third threads are anchored in the matrix by interlacing with the first threads, comprising the acts of:

immersing the first threads and respective adjacent or encompassing portions of the plurality of horizontal second threads and the plurality of vertical third threads in a bath of the matrix material; and forming concave boundary surfaces of the wall between the plurality of horizontal second threads and the plurality of vertical third threads as the matrix rises up along the plurality of horizontal second threads and the plurality of vertical third threads.

2. The method according to claim 1, wherein each of the plurality of horizontal second threads and the plurality of vertical third threads engage around a respective one of the first threads.

3. The method according to claim 1, wherein the wall is configured to be or in a form of ball segments adjoining one another or in a form of cylinder segments adjoining one another.

4. The method according to claim 1, wherein the plurality of horizontal second threads and the plurality of vertical third threads run completely or partially freely in the interior space and are not embedded in a matrix or a liner in the interior space.

5. The method according to claim 1, wherein the plurality of horizontal second threads and the plurality of vertical third threads are interlaced with the first threads in a plain weave, in a twill weave or in an m-to-n weave.

6. The method according to claim 1, wherein the plurality of horizontal second threads and the plurality of vertical third threads are embedded partially in a matrix such that a plurality of gas-tight external chambers are formed in the interior space.

\* \* \* \* \*